May 24, 1966     S. CORNBERG     3,252,705
BOWLING BALL VIEWING APPARATUS

Filed Sept. 24, 1962     4 Sheets-Sheet 1

INVENTOR.
SOL CORNBERG
BY Arthur H. Seidel
ATTORNEY

May 24, 1966     S. CORNBERG     3,252,705
BOWLING BALL VIEWING APPARATUS
Filed Sept. 24, 1962     4 Sheets-Sheet 2
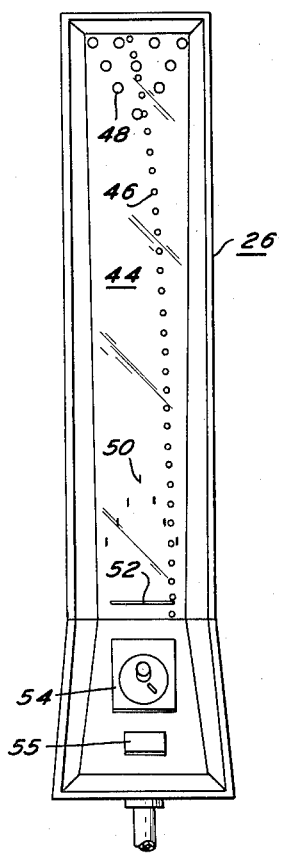
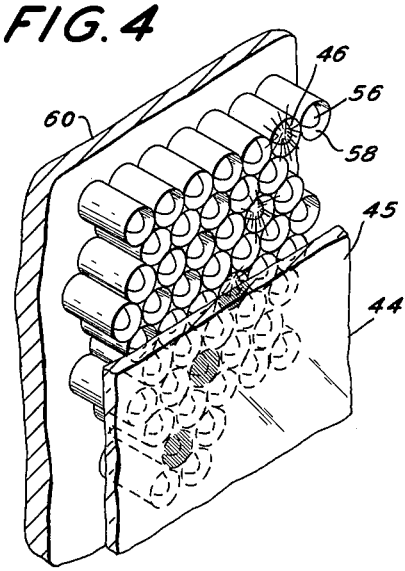
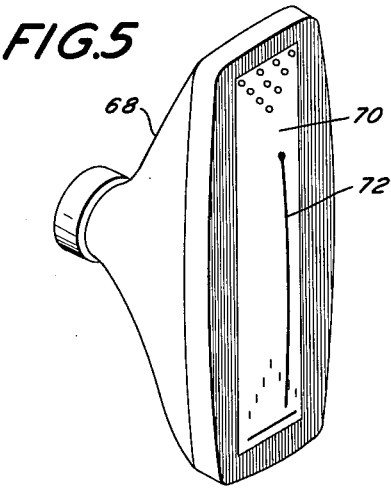
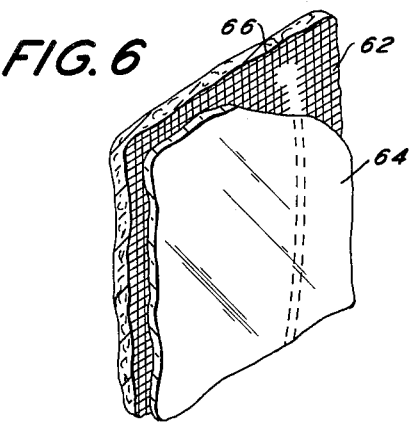
INVENTOR.
SOL CORNBERG
BY Arthur H. Seidel
ATTORNEY

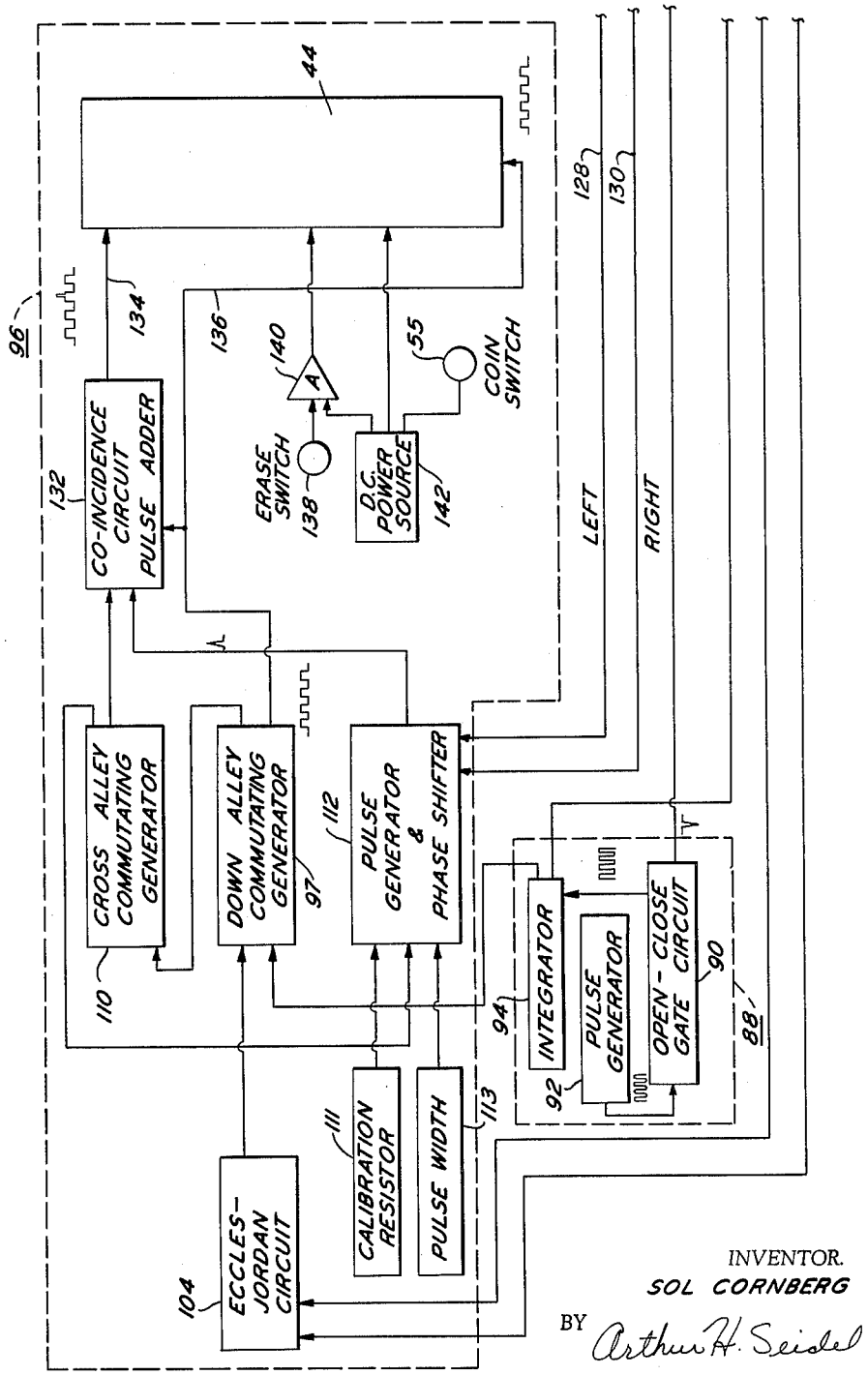

May 24, 1966   S. CORNBERG   3,252,705
BOWLING BALL VIEWING APPARATUS
Filed Sept. 24, 1962   4 Sheets-Sheet 4

FIG. 7B

INVENTOR.
SOL CORNBERG
BY Arthur H. Seidel
ATTORNEY

_United States Patent Office_

3,252,705
Patented May 24, 1966

3,252,705
BOWLING BALL VIEWING APPARATUS
Sol Cornberg, 240 Central Park S., New York, N.Y.
Filed Sept. 24, 1962, Ser. No. 225,619
14 Claims. (Cl. 273—54)

In general, this invention relates to a new concept in the viewing of a bowling match. More particularly, it relates to apparatus for providing a visual representation of the progress of the bowled ball from the moment it has left the bowler's hand to the completion of the roll.

At present, a bowler must rely on his memory to determine the exact path of travel of his ball and the exact point of contact with the pins. He has no method of determining how to correct the manner in which he throws the ball down the alley except by trial and error.

Additionally, with the advent of professional bowling and the accompanying large galleries of spectators, only those spectators near the bowling lane can follow the actual path of the ball.

The professional bowling instructor has also been limited because apparatus was not available to display to the pupil for a predetermined length of time the path of a ball, the point of impact, and the resultant disposition of all pins as the result of the last roll on the lane. Thus, the student bowler was limited by his memory in his attempts to improve his game. No apparatus was available to allow the student to visualize what happened, how it happened, and what can be done to improve his game.

With the advent of television viewing of bowling matches, television cameras were placed behind the bowling pins to give the viewer a close-up of the ball as it travelled down the alley and came in contact with the pins. However, the television cameraman had to use hit or miss methods of varying the focal length of the television camera to follow the ball in its path down the lane.

In order to avoid the foregoing and other difficulties, it is the general object of this invention to provide a new bowling viewing apparatus.

Another object of this invention is to provide bowling viewing apparatus which acts as an electronic mirror to reflect the progress of a bowled ball from the moment the ball has left the bowler's hand to the completion of the roll.

A further object of this invention is to provide a bowling viewing apparatus which will give a proportional representation of the bowled ball on the alley which can be viewed by the bowler, his instructor, or spectators.

Another object of this invention is to provide apparatus which will enable the bowler and spectator to see the exact travel of a bowled ball and the exact point of contact of the ball with the pins.

Another object of this invention is to provide a new and improved bowling viewing apparatus which gives a permanent record of a bowled ball with relation to the alley and pins.

Another object of this invention is to provide a new and improved bowling viewing apparatus which will allow a television camera to follow the ball during its travel down the alley.

Further objects will appear hereinafter.

For the purpose of illustrating the invention there is shown in the drawings forms which are presently preferred; it being understood, however, that this invention is not limited to the precise arrangements and instrumentalities shown.

FIGURE 3 is a front plan view of a display unit built in accordance with the principles of the present invention.

FIGURE 4 is a perspective cut-a-way view of the screen on the display unit shown in FIGURE 3.

FIGURE 5 is a perspective view of a second type of display unit utilizing the principles of the present invention.

FIGURE 6 is an exploded perspective view of the third type of display unit which might be utilized with the present invention.

FIGURES 7A and 7B are schematic showings of a circuit utilized with the apparatus shown in FIGURES 1–3.

Figure 1:
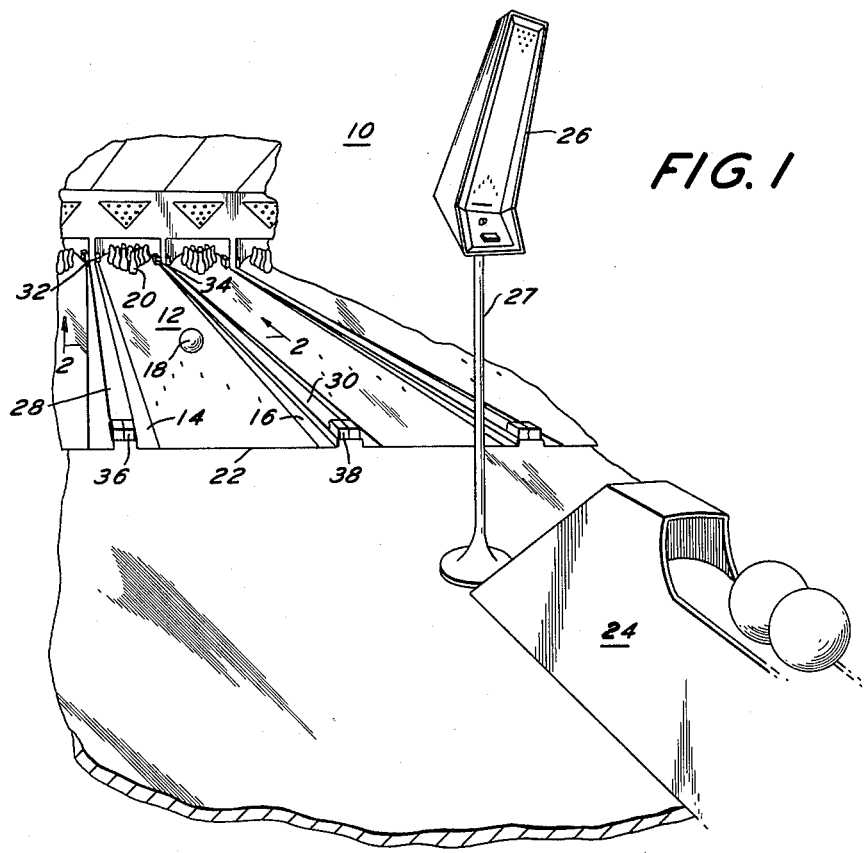
FIGURE 1 is a perspective view of a bowling alley incorporating the features of the present invention.
Figure 2:
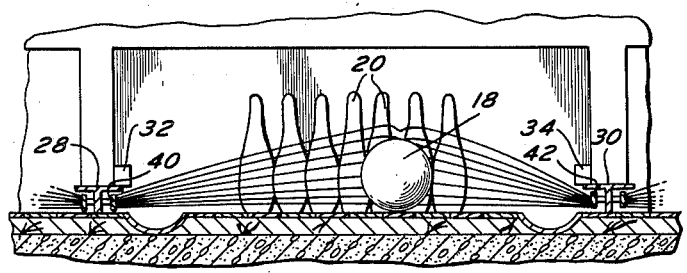
FIGURE 2 is a cross sectional view of the bowling alley of FIGURE 1 taken along lines 2—2.

In FIGURE 1, there is shown a bowling establishment 10 which is provided with apparatus built in accordance with the principles of the present invention.

The bowling establishment 10 includes a bowling alley or lane 12 having left and right gutters or channels 14 and 16 respectively. A ball 18 is shown in a position half way down the alley 12 rolling towards a set of tenpins 20. The end of the bowling alley 12 opposite from the position of the tenpins 20 is defined by a foul line 22, running transverse of the bowling alley 12.

Each bowling alley 12 in the establishment 10 is provided with a ball return rack 24 adjacent where a bowler would stand before delivery of the ball. In front of the ball return rack 24 is placed a display unit 26 built in accordance with the principles of the present invention and mounted on a suitable stand 27.

At remote points, any number of repeater display boards 26 may be set up for remote viewing in other parts of the bowling center, or via telephone cable to remote locations.

Housings 28 and 30 are provided between alleys on either side of left and right gutters 14 and 16 respectively. At the end of alley 12 behind the tenpins 20 are placed a photoelectric unit comprising a light source 32 mounted on housing 28 and a photoelectric pickup 34 mounted on housing 30.

In front of the alley 12 in line with foul line 22 are mounted a pencil light source 36 supported by housing 28 and a photoelectric receiving unit 38 mounted on housing 30. The light source 36 and photoelectric receiving unit 38 contain two photoelectric units as will be discussed below.

Within housing 28 is a flat metal wire 40 running the length of the alley 12. A similar metal strip 42 is mounted within the housing 30. The strips 40 and 42 are adapted to be energized by a source of low frequency alternating current so as to create an electric field between the wires transversely across the alley 12 for the length thereof.

The ball 18 as it moves along the alley unbalances the electric field between the two wires 40 and 42 due to its dielectric properties. The dielectric properties of the ball 18 are different from the dielectric properties of air and, therefore it is possible to measure the position of the ball on the alley relative to the center of the alley by reason of the unbalance in the electric field.

Other types of ball position sensing systems are contemplated within the scope of the present invention. For instance, a sonic or ultrasonic radiation system might be utilized which is operative from a sonic or ultrasonic transducer mounted at the extreme ends of the alley or along the gutter edges. In this system, two ultrasonically excited nickel tubes partially damped at the end nearest the pins may be utilized. The reflected wave along the ultrasonically excited tubes is completely absorbed at the initiation end. Nickel tubes would be excellent for these purposes as they have a long delay time in the neighborhood of 7 microseconds per inch. The degree of unbalance between the two nickel tubes created by the movement of the ball could be utilized for the ball position sensing system.

Another type of ball position sensing system would be an isotope radiation system in which a low energy source of gamma radiation is embedded deep into the bowling ball's finger recess. The gamma radiation source, being a thin non-toxic wafer containing a quantity of radioactive salt, in no way causes an unbalance in the ball. As the ball passes down the alley, scanning and/or fixed radiation detection devices along the alley's gutter edges may be utilized to detect the ball's speed and position.

Another means of detetcing the ball position may be a controlled beam of light projected across the alley. A plurality of these beams may be post scanned or continuously transmitted. The bowled ball, in interrupting the light beams, is sensed photoelectrically along the gutter edges and/or at the ends of the alley.

A still further method of radiation sensing the ball position would be the placement of a magnetic material witihin the finger holes of the balls in the center thereof which would unbalance a magnetic field created by magnetic strips along the edges of the alley.

Whatever the method of determining the ball position, this information is transmitted to the display unit 26 to be shown thereon. The display unit 26 consists of a display panel 44 upon which a trace 46 of the ball movement down the alley is presented. The display board 44 has recorded thereon a proportional representation of the tenpins 48 on the alley. The proportional representation of the tenpins 48 may be permanently made or provision may be had for sensing the movement of the actual tenpins 20 and this may be recorded on the display board 44 in addition to the trace 46.

There is also provided on the display board 44 a proportional representation of the spots 50 on a normal bowling alley along with the position of the foul line represented by the line 52.

The display board unit 26 additionally includes an erase button 54 to be pushed after the trace 46 has been noted by the bowler. Immediately below the erase button 54, there may be provided a coin slot 55 for payment by the bowler for the use of the ball position sensing equipment.

The display board 44 is shown in a partial isometric view in FIGURE 4. In this view, it is shown that the display board 44 consists of a transparent covering such as glass 45 over a plurality of lights 56 within tubular light reflectors 58 in horizontal rows. The horizontal rows of lights are staggered so as to give better definition of the trace 46 and for purposes which will be explained hereinafter with respect to FIGURE 7. The lights 56 and reflectors 58 are mounted on a light reflecting support surface 60.

An alternative to the type of display unit shown in FIGURE 4 is the cathode ray tube 68 shown in FIGURE 5. Such a display unit would utilize the trace 72 on the screen of the cathode ray tube 68 to provide the display. A permanently mounted proportional representation of the alley 70 would be presented on the screen of the cathode ray tube 68 so that the trace 72 would give an accurate representation of the movement of the ball down the alley to the viewer.

An alternative to the embodiments shown in FIGURES 4 and 5 would be an electroluminescent screen 62 provided with a transparent covering 64 and a wire mesh coating 66 where each cross over point of the wire mesh could be individually energized from a delay line scanning system. In this manner, movement of the ball down the alley could be displayed by means conventional in the electroluminescent art.

Other means of displaying the ball position may be utilized in place of or in addition to the recorders shown in FIGURES 3–6. One such unit could trace the movement of the ball as a projection of a punched opaque tape onto a translucent screen, the displacement of the punched holes being determined by the ball position on the alley and the speed of tape travel being proportional to the ball's speed on the alley.

Another display unit would create the ball trace curve as an electro-mechanically actuated string of interconnected beads of magnetic material. These beads of magnetic material may be activated by a traveling magnetic shoe behind a non-magnetic panel. If the movement of the shoe is made proportional to the movement of the ball with respect to its speed and lateral displacement, the interconnected beads will provide a permanent representation of the bowled ball's course.

In FIGURE 7, there is shown one form of a circuit which could be utilized in accordance with the principles of the present invention on a unit such as is shown in FIGURES 1–4. In FIGURE 7, there is shown two light sources 74 and 78 which are physically found within the light unit 36, and two photoelectric cells 76 and 80 physically found within the photoelectric unit 38 discussed with reference to FIGURE 1. The light unit 74 and photoelectric pickup 76 are positioned at the foul line 22 to initiate the operation of the circuitry. When a ball interrupts the light beam from the source 74, a pulse is transmitted by an amplifier 84 associated with the photoelectric pickup 76. A second pulse is transmitted by an amplifier 86 associated with photoelectric pickup 80 when the light beam from light source 78 is interrupted. These two light units and photoelectric pickups form a start and rate sensing unit.

If desired, a low frequency impact actuator 82 may be provided to sense when the ball hits the alley and to initiate the system upon such contact. The low frequency impact actuator would be a vibration sensing device tuned to the frequency transmitted when a bowling ball hits the wooden alley. As such, it could be placed below the floor boards of the alley adjacent the foul line 22.

As stated previously, the output from the amplifiers 84 and 86 forms a rate sensing unit. When the first pulse is transmitted by the amplifier 84, it is fed to an open-close gate circuit 90 to open this circuit. The open-close gate circuit 90 may include a bistable flip-flop operative to open and close a gate circuit. When the gate circuit is opened, pulses from a pulse generator 92 are fed through the gate to an integrating circuit 94. The integrating circuit 94 counts up the number of pulses fed to it and supplies a D.C. output signal proportional to the number of pulses received. This integrating circuit may be in the form of a capacitor unit with each pulse increasing the voltage on the capacitor unit.

When a pulse is received from the amplifier 86 indicating that the ball has interrupted the light beam from source 78, it is operative to close the gate circuit 90. At this point, no more pulses are fed to the integrator 94 and its output remains clamped at a D.C. voltage proportional to the speed of the bowling ball. The entire circuit including gate circuit 90, pulse generator 92, and integrator 94 has been designated by the numeral 88 as a rate of speed detector. The D.C. output from the integrator 94 feeds one input of a down alley commutating generator 97 of a pulsing and display unit 96 for purposes which will be discussed hereinafter.

The low frequency impact actuator 82 is operative as was stated previously to detect a low frequency signal when a ball hits the alley. This low frequency signal is supplied to a low pass filter 98 which eliminates any high frequency noise signals and thence to a low frequency amplifier clipper and shaper 100 whose output is a square wave pulse signal. The output of the low frequency amplifier 100 is utilized to trip a start gate 102 to start operation of the pulsing and display unit 96. The start gate 102 might in the alternative be operated by a signal from the amplifier 84 when a ball interrupts the light beam from source 74. In this case, the low frequency actuator 82 and its associated circuits 98 and 100 would be eliminated. The connection between amplifier 84 and start gate 102 which might be utilized would be a direct connection.

The pulse output from the start gate 102 is operative to change the state of an Eccles-Jordan bistable multi-vibrator 104 so as to supply an initiating signal to the down alley commutating generator 97. The Eccles-Jordan bistable multi-vibrator 104 will return to its initial state when the bowling ball passes through and interrupts the light beam from lamp 32. This will cause a pulse output from a photoelectric pickup 34. Photoelectric pickup 34 has its output amplified by an amplifier 105. The output of amplifier 105 is clipped by a pulse amplifier and clipper 106 so as to supply a proper inut signal to a stop gate 108 similar to start gate 102. The stop gate 108 will then supply a pulse signal to the Eccles-Jordan trigger 104 causing it to change state. When this occurs, the down alley commutating generator 97 is deenergized.

The down alley commutating generator 97 is operative when energized to supply pulse output signals proportional to the input from integrator 94. Thus, the output pulses from down alley commutating generator 97 are proportional to the speed of a ball down the alley.

The output of the down alley commutating generator is fed directly to the display board 44 so as to energize each horizontal row of neon lights at a speed proportional to the speed of the ball.

The down alley commutating generator 97 also energizes a cross alley commutating generator 110. The cross alley commutating generator 110 supplies output pulses proportional to the number of input pulses from the down alley commutating generator 97. For instance, if 22 neon lights are provided in each horizontal row of the display board 44, the cross alley commutating generator 110 will supply 22 output pulses for each input pulse from the down alley commutating generator 97. The cross alley commutating generator 110 has one of its outputs connected to a pulse generator and phase shifter 112 so that the outputs of the cross alley commutating generator 110 and the pulse generator and phase shifter 112 will be synchronized.

The pulse generator and phase shifter 112 may be a bias controlled discharge tube which can be adjusted from a calibrated resistor 111 for a balanced output and whose pulse width can be determined by an impedance network 113.

As was stated previously, the flat wires 40 and 42 utilized for ball position sensing are energized from a low frequency source 114 centrally grounded by ground wire 41. Low frequency source 114 may be a stable R.C. oscillator with a zero adjust unit 116 so as to maintain balance potential upon the wires 40 and 42. Any unbalance between the wires 40 and 42 caused by a ball rolling down the alley is transmitted by the low frequency oscillator to a phase discriminating bridge circuit 118. The phase discriminator 118 is supplied power by a low frequency crystal reference oscillator 120 whose sensitivity is determined by an impedance network 121. The phase discriminator 118 is operative to supply a D.C. signal along line 122 if the ball 18 is to the left of the center of alley 12 or a D.C. signal to output line 124 if the ball 18 is to the right of the center of alley 12. The signals along lines 122 or 124 are amplified by a D.C. amplifier 126 to left and right signal lines 128 and 130. Left and right signal lines 128 and 130 are operative to control the pulse generator and phase shifter 112. The pulse generator and phase shifter 112 will normally fire a pulse signal after half the pulses from the cross alley commutating generator 110 initiated by a single pulse from the down alley commutating generator 97 have been transmitted. An input from the right or left output lines 130 and 128 will change the relative timing of the trigger pulse from the pulse generator and phase shifter 112. The output trigger pulse from the pulse generator and phase shifter 112 is fed along with the output from the cross alley commutating generator 110 to a coincidence circuit pulse adder 132. The coincidence circuit pulse adder is operative to combine the last-mentioned input signals and provide an output signal along line 134. As shown adjacent line 134, the trigger pulse from the pulse generator and phase shifter 112 will appear as an added pulse to the square wave output of the cross alley commutating generator 110. The magnitude of the square wave output of the cross alley commutating generator 110 is insufficient to light a neon bulb on the display board 44. However, the sum of the firing pulse from the pulse generator and phase shifter 112 and the square wave from the cross alley commutating generator 110 is sufficient to light a neon bulb.

The output along line 134 is supplied in succession to each bulb along a given horizontal line. In this manner, only that bulb which receives an added pulse will be ignited.

Coincidence circuit 132 is also operative to shift the phase of alternative groups of pulses from the cross alley commutating generator 110 plus and minus 180 degrees in accordance with pulses from the down alley commutating generator 97. This causes approximately every other line of horizontal neon bulbs on the display board 44 to be energized in accordance with the position of the ball on the alley. It will be recognized by one skilled in the art that in this manner a complete sweep of the horizontal positions across the alley has been accomplished and an accurate display has been provided.

After one complete ball movement down the alley 12, the bowler may look at the display board and determine in what way he may improve his game.

He then presses an erase switch 138 which through a D.C. amplifier 140 supplies a voltage to the neon board to de-energize all the lights on the board. The display board 44 is normally powered from a D.C. power source 142 which can be operated from the coin switch 55 shown in FIGURE 3.

In addition to the display board 44, it is possible to utilize the output of the rate of speed detector 88 to control a T.V. camera placed at the end of the alley 12 behind the tenpins 20. The T.V. camera 150 has a motor operated focusing lens which is originally set to be in focus for the foul line 22. The T.V. camera 150 is controlled by a motor focus control unit 148. When the focus control system is to be utilized, a switch 146 is closed connecting the motor focus control unit 148 to the output of integrator 94, start gate 102 and stop gate 108. When the start gate 102 transmits its output signal, it energizes the motor focus control 148 which then proceeds to vary the focal length of the T.V. camera 150 in accordance with the output of the integrator 94. In this manner, the T.V. camera changes its focus in accordance with the speed of the ball and remains in focus until the ball reaches the end of the alley 12. At this point, stop gate 108 transmits a signal to stop the motor focus control 148 and return it to its initial position.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for recording the movement of a ball down a bowling alley having side gutters from the foul line at one end of the alley to the other end of the alley comprising radiation generating apparatus for generating a radiation energy field the length of the alley, sensing means for detecting a distortion in the radiation field due to the movement of a ball down the alley, and recording means coupled to said sensing means for making a proportional representation of the distortion of the field due to the ball.

2. The apparatus of claim 1 wherein said sensing means includes a first radiation sensor located adjacent the foul line at one end of the alley to sense the start of a ball's movement down the alley, said first radiation sensor being operative to initiate operation of said sensing means and recording means, and a second radiation sensor located at the other end of the alley and operative to sense the end of a ball's movement down the alley to de-energize said sensing means and said recording means.

3. The apparatus of claim 1 wherein said sensing means includes means for sensing the speed of a ball down the alley, said sensing means being operative to control said recording means to record the movement of the ball in accordance with the speed thereof.

4. The apparatus of claim 3 including a motor controlled variable focus camera located at the other end of the alley, said variable focus motor controlled camera being controlled by said sensing means speed detecting means to vary the focus of said camera in accordance with the speed of the ball.

5. The apparatus of claim 1 wherein said radiation generating means includes radiation generators located along at least one gutter of the alley for the length thereof, the radiation field generated by said radiation generators being symmetrical about the longitudinal axis of said alley, said sensing means being adapted to detect eccentricities in said radiation field to determine the transverse position of ball on the alley.

6. Apparatus for recording the movement of a ball down a bowling alley having side gutters from the foul line at one end of the alley to the other end of the alley, comprising radiation generating apparatus for generating a radiation field the length of the alley, sensing means for detecting a distortion in the radiation field due to the movement of a ball down the alley, recording means coupled to said sensing means for making a proportional representation of the distortion of the field due to the ball, said radiation means including radiation generators located along at least one gutter of the alley for the length thereof, the radiation field generated by said radiation generators being symmetrical about the longitudinal axis of said alley, said sensing means being adapted to detect eccentricities in said radiation field to determine the transverse position of a ball on the alley, said radiation generators including electrically conducting wires running the length of the alley along each gutter, and an alternating current source adapted to energize said wires to produce a symmetrical electrical field across the alley for the length thereof.

7. The apparatus of claim 1 wherein said recording means includes a panel of neon bulbs arranged in horizontal rows, each of said horizontal rows proportionally representing a portion of the alley, and a translucent sheet mounted over said neon bulbs, said translucent sheet having indicia thereon representing the bowling alley whereby energization of single lamps in each of said horizontal rows provides a proportional representation of the travel of a ball down the alley.

8. Apparatus for recording the movement of a ball down a bowling alley having side gutters from the foul line at one end of the alley to the other end of the alley comprising radiation generating apparatus for generating a radiation energy field the length of the alley, sensing means for detecting a distortion in the radiation field due to the movement of a ball down the alley, recording means coupled to said sensing means for making a proportional representation of the distortion of the field due to the ball, said recording means including a cathode ray tube, said cathode ray tube having a retentive fluorescent screen adapted to be activated by a beam of electrons, said fluorescent screen having indicia on the outer surface thereof representing a bowling alley, said sensing means being operative to control said electron beam in accordance with the movement of a ball down the bowling alley to provide a trace on said indicia proportional to the movement of a ball down the alley.

9. The apparatus of claim 1 wherein said recording means includes an electroluminescent screen, said sensing means being operative to energize points on said electroluminescent screen in accordance with the movement of a ball down the alley to provide a light trace on said electroluminescent screen in accordance with the movement of a ball down the alley.

10. Apparatus comprising a first source of radiation providing a beam of radiation across a bowling alley adjacent the foul line thereof, a second radiation source providing a radiation beam parallel to said first radiation beam intermediate the ends of said alley, first and second radiation sensing means for sensing said first and second radiation beams respectively, said first and second radiation sensing means providing electrical signals when their respective radiation beams are interrupted, electrical signal apparatus providing a signal proportional to the speed of a ball rolled down the alley in accordance with the time between the interruptions of said first and second radiation beams, a motor controlled variable focus camera located at the end of the alley opposite from the foul line, said motor controlled variable focus camera having its focal length varied in accordance with the output signal of said electrical signal apparatus.

11. Apparatus comprising a first source of radiation providing a beam of radiation across a bowling alley adjacent the foul line thereof, a second radiation source providing a radiation beam parallel to said first radiation beam intermediate the ends of said alley, first and second radiation sensing means for sensing said first and second radiation beams respectively, said first and second radiation sensing means providing electrical signals when their respective radiation beams are interrupted, electrical signal apparatus providing a signal proportional to the speed of a ball rolled down the alley in accordance with the time between the interruptions of said first and second radiation beams, said electrical signal apparatus including a pulse generator and an integrator, said first radiation sensing means being adapted to initiate said pulse generator to supply pulses to said integrator, said second radiation sensing means being adapted to stop pulses from said pulse generator from being fed to said integrator, said integrator being operative to integrate the pulses received from said pulse generator to form an output signal proportional to the speed of a ball moving down the alley, and means responsive to said output signal to sense the position of a ball as it moves down the alley.

12. The apparatus of claim 11 including a display board, said display board providing a trace of the ball movement down the alley, means for determining the transverse position of a ball as it moves down the alley, said integrator and last-mentioned means being adapted to control the excitation of said display board in accordance with the speed and position of a ball down the alley.

13. Apparatus comprising a first source of radiation providing a beam of radiation across a bowling alley adjacent the foul line thereof, a second radiation source providing a radiation beam parallel to said first radiation beam intermediate the ends of said alley, first and second radiation sensing means for sensing said first and second radiation beams respectively, said first and second radiation sensing means providing electrical signals when their respective radiation beams are interrupted, electrical signal apparatus providing a signal proportional to the speed of a ball rolled down the alley in accordance with the time between the interruptions of said first and second radiation beams, said electrical signal apparatus including a pulse generator and an integrator, said first radiation sensing means initiating said pulse generator to supply pulses to said integrator, said second radiation sensing means being adapted to stop pulses from said pulse generator from being fed to said integrator, said integrator being operative to integrate pulses received from said pulse generator to form an output signal proportional to the speed of a ball moving down the alley, a display board, said display board providing a trace of the ball movement down the alley, said integrator controlling the excitation of said display board in accordance with the speed of a ball down the alley, radiation generating means for generating a radiation field the length of a bowling alley, means for detecting distortion of said field due to the movement of a ball down the alley, said last-mentioned means being operative to supply a signal to said display board in accordance with the transverse position of a ball on the alley, and synchronizing means for synchronizing said last-mentioned means output signal with said integrator output signal to provide a trace proportional to the movement of a ball down the alley on said display board.

14. The apparatus of claim 13 wherein said display board is operative to retain a trace after operation of said integrator, last-mentioned means, and said synchronizing means, and erase means for erasing said trace from said display board.

References Cited by the Examiner

UNITED STATES PATENTS

| | | | |
|---|---|---|---|
| 1,946,290 | 2/1934 | Lord. | |
| 2,331,237 | 10/1943 | Schaefer | 273—182 |
| 2,581,738 | 1/1952 | Williams | 273—181 |
| 2,587,018 | 2/1952 | Weisfeldt. | |
| 2,650,095 | 8/1953 | MacLagan | 273—50 |
| 2,767,987 | 10/1956 | Klose | 273—102.2 |
| 2,807,164 | 9/1957 | Rumbaugh | 73—167 |
| 2,859,385 | 11/1958 | Bentley. | |
| 2,894,752 | 7/1959 | Simjian | 273—102.2 X |
| 3,009,268 | 11/1961 | George. | |
| 3,016,812 | 1/1962 | Chatlain | 273—54 X |
| 3,051,485 | 8/1962 | Heilbrun | 273—54 |
| 3,145,025 | 8/1964 | Morrison et al. | 273—54 |

DELBERT B. LOWE, *Primary Examiner.*

A. O. OECHSLE, *Assistant Examiner.*